June 10, 1924.
W. G. RICHARDSON
ROWLOCK
Filed May 17, 1923
1,497,162
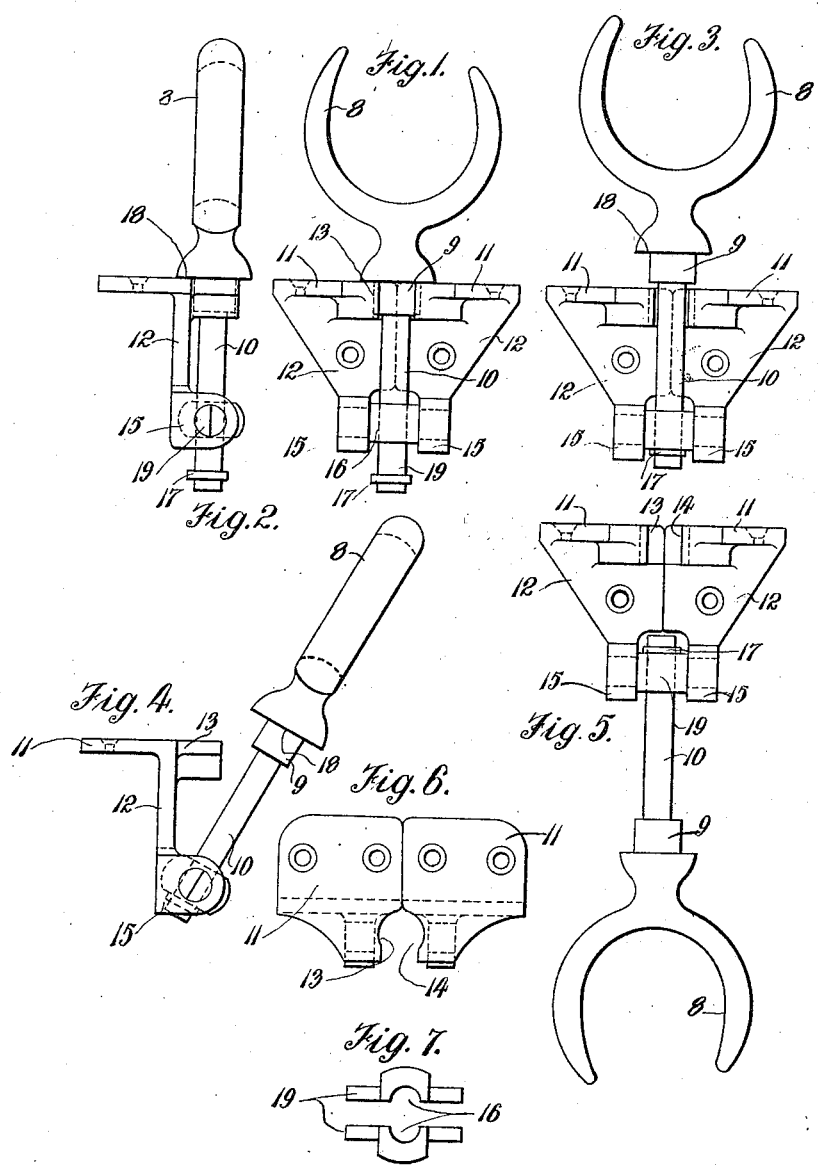

Patented June 10, 1924.

1,497,162

UNITED STATES PATENT OFFICE.

WILLIAM GEORGE RICHARDSON, OF GANNOCK PARK, DEGANWY, WALES.

ROWLOCK.

Application filed May 17, 1923. Serial No. 639,611.

*To all whom it may concern:*

Be it known that I, WILLIAM GEORGE RICHARDSON, a subject of the King of Great Britain, residing at Maryland, Gannock Park, Deganwy, North Wales, have invented certain new and useful Improvements in and Relating to Rowlocks, of which the following is a specification.

This invention relates to rowlocks of the type formed or provided with a stem, rotatably supported in a mounting connected to the gunwale or the like, which stem is provided with an enlarged portion and a portion of less diameter, the mounting having a socket with an opening in the side adapted to allow the passage of the narrow portion therethrough but not allowing the passage of the enlarged portion, so that in the shipped position the enlarged portion fits in the socket and holds the rowlock firmly in position, whilst when raised the enlarged portion is removed from the socket and the rowlock can be turned into the unshipped position.

With rowlocks of this type it has been proposed to form or provide the end of the stem with a bulbous or enlarged portion which is able to slide in a restricted groove in the mounting and to allow the stem to turn thereon when the rowlock is unshipped. With other types of rowlocks adapted to be shipped and unshipped without being detached it has been proposed to form the lower end of the stem with a slot adapted to work over a pin held between two lugs on the mounting.

According to the present invention, the rowlock which is of the type to which the invention relates has its stem passing through an apertured trunnion supported by bearings in the mounting, the trunnion and the mounting preferably each being made in two parts and the end of the stem having an enlargement which cannot pass through the aperture in the trunnion.

And in order that the invention may be better understood, it will now be described with reference to the accompanying drawing:—

Fig. 1 shows one form of rowlock complete made according to the invention.

Fig. 2 shows a side elevation of same.

Fig. 3 shows a similar view to Fig. 1, but with the rowlock proper in the raised position.

Fig. 4 shows a similar view to Fig. 2, but with the rowlock proper raised and slightly turned.

Fig. 5 shows a similar view to Figs. 1 and 3, but with the rowlock proper turned completely down.

Fig. 6 shows a plan view of the mounting portion of the rowlock.

Fig. 7 shows a detail hereinafter referred to.

8 is the rowlock which is formed with a stem, the upper part 9 of which is of greater diameter than the lower part 10. The mounting is cast or otherwise made in two halves each comprising a top plate 11, and downwardly extending portion 12, both of which are formed with countersunk holes for attaching the mounting to the gunwale by screws, rivets or the like. When the two halves of the mounting are placed in correct relative position as shown in Fig. 6, an aperture 13 is formed in the top having a slot 14 in the side. This aperture 13 is of suitable shape and size to contain the enlarged part 10 of the stem, as shown in Figs. 1 and 2, the width of the slot 14 being less than the diameter of this enlarged part. The portion 10 of less diameter however can pass through the slot. The downwardly extending portions 12 of the mounting are formed with bearings 15, which come into axial alignment with each other. In these bearings is mounted a trunnion 12 made in two halves, see Fig. 7, which when assembled in correct relationship have an aperture 16, between them through which the portion 10 of the stem can slide. 17 is a flange or collar on the lower end of the stem and 18 is a bearing flange coming just above the enlarged part 9.

In assembling the complete rowlock, the two halves of the trunnion 19 are placed around the part 10 of the stem above the flange 17. The two halves of the mounting are now brought so that the bearings 15 pass on to the spindle like projections of the trunnions. By screwing or otherwise securing the assembled rowlock to the gunwale or the like, the parts are maintained in their assembled relationship.

When using the rowlock, the parts are brought into the position shown in Figs. 1 and 2, where it will be seen that the rowlock proper is adequately supported to withstand rowing stresses and the like, and at the same time is free to move around the axis of the stem to accommodate itself to the movement of the oar or the like. To unship the rowlock it is simply necessary first to raise the rowlock proper from the aperture 13, this position is shown in Fig. 3. The upward movement is limited by the flange 17, which prevents the complete removal of the rowlock proper.

It is now possible to turn the rowlock inboard as the part 11 of the stem can pass through the slot 14. Fig. 4 shows the rowlock partly turned down and in Fig. 5, it is completely turned and hanging down supported by the flange 17.

In some cases the mounting may be formed from one casting and other means adapted for assembling the rocking trunnion or its equivalent, which in some cases might also be in one piece, means being provided for preventing the removal of the stem of the rowlock.

What I claim as my invention and desire to secure by Letters Patent of the United States of America is:—

1. The combination of a rowlock provided with a stem, a member comprising a pair of devices having an opening in their opposing sides to receive the stem and provided at their ends with trunnions, and a mounting member for attachment to a gunwale and also comprising a pair of operable devices each having an opening to receive one of the trunnions, the said devices having an opening in their opposing sides to receive the rowlock stem.

2. The combination of a rowlock provided with a stem, a member comprising a pair of devices having an opening in their opposing sides to receive the stem and provided at their ends with trunnions, and a mounting member for attachment to a gunwale and also comprising a pair of operable devices each having an opening to receive one of the trunnions, the said devices having an opening in their opposing sides to receive the rowlock stem, the said stem having an enlarged portion immediately below the rowlock to fit in said opening.

In witness whereof I affix my signature.

WILLIAM GEORGE RICHARDSON.